United States Patent [19]

Smart

[11] Patent Number: 5,272,986
[45] Date of Patent: Dec. 28, 1993

[54] TOWING SWIVEL FOR PIPE INSPECTION OR OTHER VEHICLE

[75] Inventor: David Smart, Whitley Bay, Great Britain

[73] Assignee: British Gas plc, London, England

[21] Appl. No.: 43,983

[22] Filed: Apr. 7, 1993

Related U.S. Application Data

[63] Continuation of Ser. No. 877,730, May 4, 1992, abandoned.

[30] Foreign Application Priority Data

May 13, 1991 [GB] United Kingdom ............... 9110328

[51] Int. Cl.⁵ ............... B61B 13/10; B61G 5/00; B61G 7/10
[52] U.S. Cl. ............... 104/138.2; 105/3; 213/75 R; 213/188; 280/480; 280/411.1
[58] Field of Search ............... 104/138.2; 105/3; 213/1 R, 75 R, 86, 98, 182, 187, 188, 208; 280/480, 467, 411.1

[56] References Cited

U.S. PATENT DOCUMENTS

| | | | |
|---|---|---|---|
| 1,543,553 | 6/1925 | Cox et al. | 213/182 |
| 2,604,521 | 7/1952 | Boucher | 104/138.2 X |
| 4,212,248 | 7/1980 | Maybury | 104/138.2 |
| 4,838,170 | 6/1989 | Illakowicz | 104/138.2 |

FOREIGN PATENT DOCUMENTS

| | | | |
|---|---|---|---|
| 517965 | 12/1920 | France | 280/480 |
| 117403 | 5/1990 | Japan | 104/138.2 |
| 367361 | 3/1963 | Switzerland . | |
| 893801 | 4/1962 | United Kingdom . | |
| 2034431 | 6/1980 | United Kingdom . | |

*Primary Examiner*—Robert J. Oberleitner
*Assistant Examiner*—S. Joseph Morano
*Attorney, Agent, or Firm*—Larson and Taylor

[57] ABSTRACT

A vehicle 10 which inspects pipes 12 using flux-leakage has a flux generating electromagnet 14 and foils 18, 20 to transfer the flux to the pipewall 12. Sensors 22 detect flux forced to leak from the pipe by defects. The vehicle is required to pass 1-D bends as shown and has a swivel 40 having a load bar 48 on which there is a link 46 of a towing chain 26. On straight pipe the link 46 occupies a first position nearer to the axis 44. In a bend the swivel turns so that the link 46 can slide along the load bar 48 to a second position further from the axis 44. This reduces the angle which the chain 26 makes with the axis 44 and jamming of the vehicle 10 in the bend is avoided.

12 Claims, 4 Drawing Sheets

TOWING SWIVEL FOR PIPE INSPECTION OR OTHER VEHICLE

This application is a continuation of application Ser. No. 07/877,730 filed May 4, 1992, now abandoned.

The invention relates to towing swivels for pipe inspection or other vehicles.

The invention has particular, though not exclusive, application to towed vehicles for inspecting buried cast iron gas pipes using flux leakage techniques. Another application is to vehicles designed to carry a camera through the pipe to inspect the pipe for inwardly directed protrusions or non-circularity; or to vehicles designed to locate side branch pipes leading off the main pipe; and machines designed to connect a replacement plastic branch pipe to a plastic liner occupying the main pipe.

In all such applications it is important that the vehicle shall successfully negotiate any bend it might encounter.

The object of the invention is to provide a towing swivel by which a vehicle may be towed.

According to the invention, a towing swivel comprises a pipeline inspection or other vehicle having a towing swivel at its front end rotatable about the central longitudinal axis of the vehicle, the swivel comprising a load bar extending transversely, and radially with respect, to said axis and a link or clip freely slidable along the load bar for connection to a towing means, the link or clip moving between a first position on the load bar (corresponding to towing along a straight pipe) and a second position (corresponding to towing around a bend), said second position being further from said axis and closer to the centre of curvature of said bend.

Embodiments of swivel will now be described by way of example with reference to the accompanying drawings in which.

Figure 1:
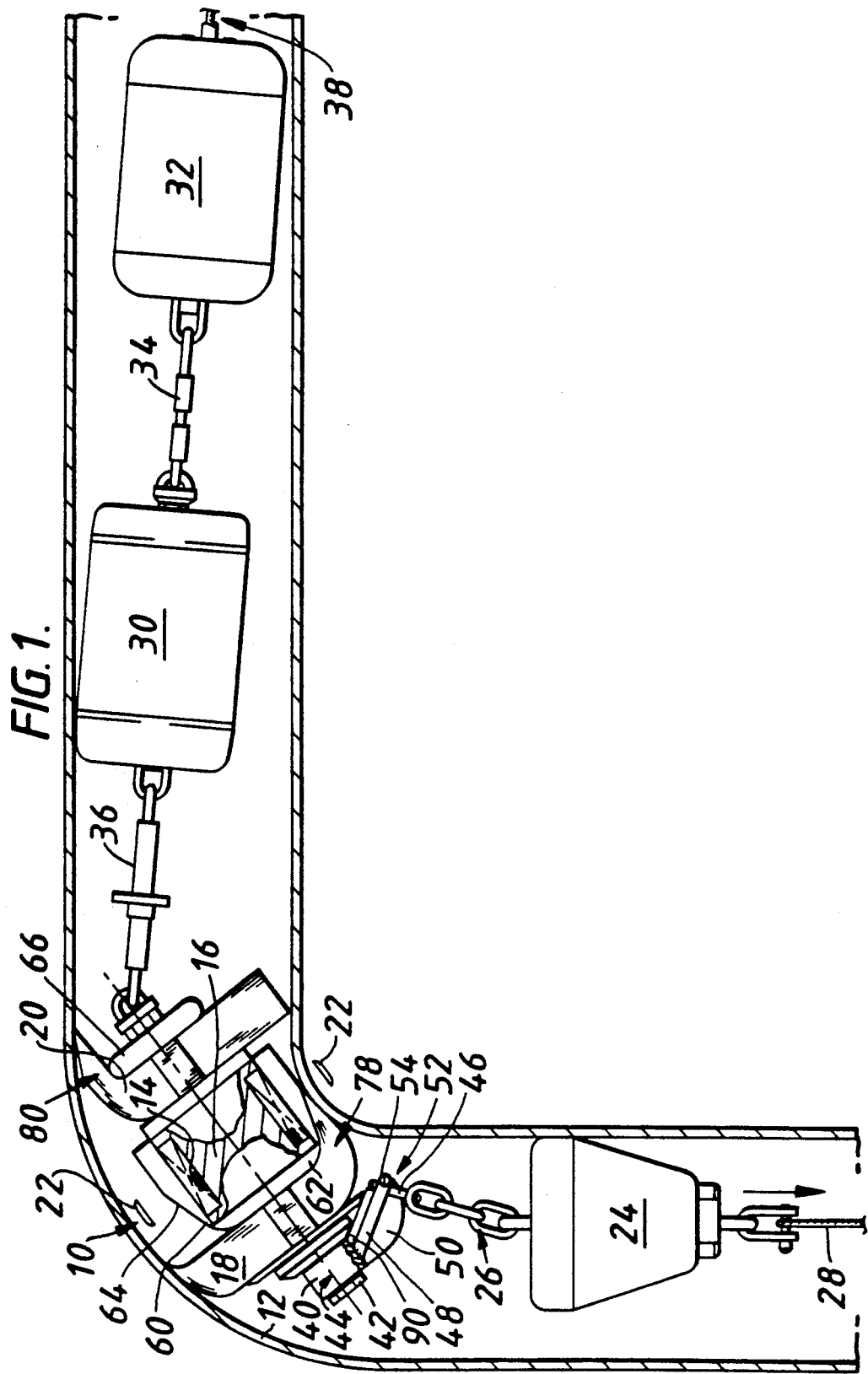
FIG. 1 is a plan of a pipe inspection vehicle in a gas pipe.
Figure 2:
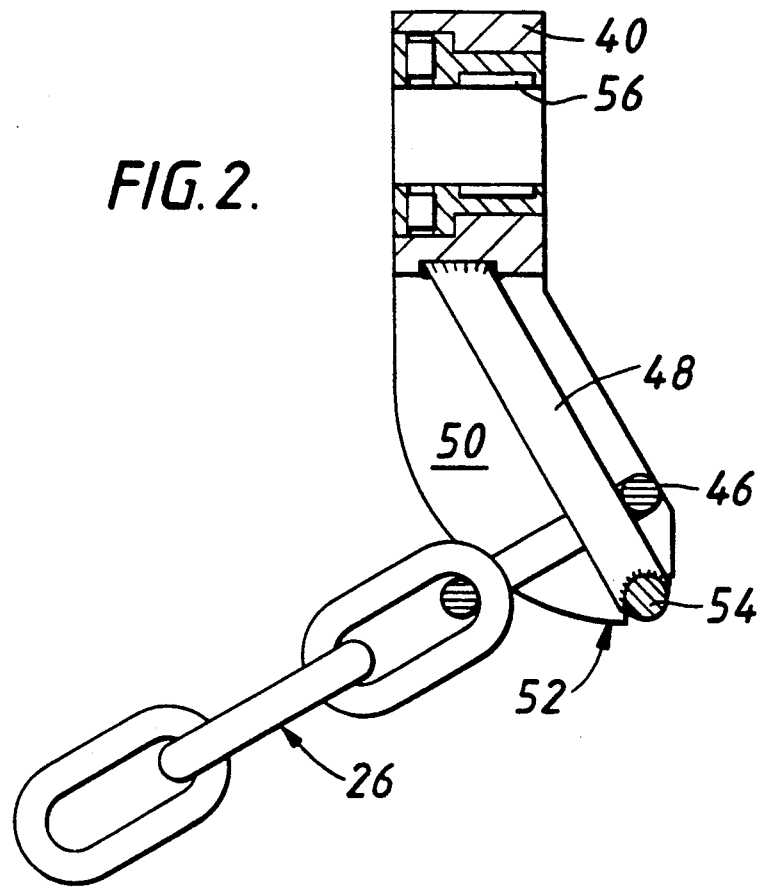
FIG. 2 is a plan of a first embodiment of a swivel forming part of the vehicle shown in FIG. 1.
Figure 3:
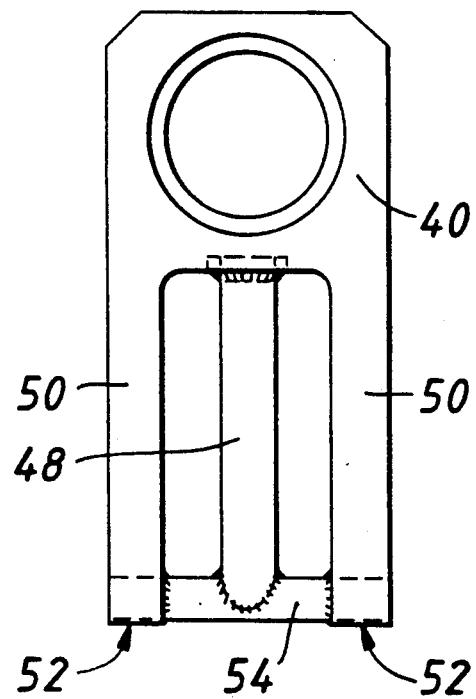
FIG. 3 is front elevation of the swivel shown in FIG. 2.

One embodiment of vehicle is shown in FIGS. 1 to 3 of the accompanying drawings. In this example the vehicle 10 is a magnetic vehicle for inspecting a gas pipe 12 for external corrosion defects (known as metal loss defects) using the flux leakage detection system. The vehicle 10 comprises an electromagnet 14 having its turns wound around a ferromagnetic core 16 having its central longitudinal axis coincident with the lengthwise direction of the vehicle 10. At each end of the electromagnet there is a pack of ferromagnetic foils 18, 20 for transferring flux from the magnet 14 to the wall of the pipe 12. A circumferential array of sensors 22 is mounted around the magnet 14 to detect magnetic flux which is deflected internally out of the pipewall by the presence of defects on the outer surface of the pipe 12.

The vehicle 10 is in train with a leading vehicle 24, to which it is connected by a towing means in the form of a chain 26. The vehicle 24 is towed in the direction of the arrow through the pipe (which has been purged of gas) by a cable 28 connected to a winch (not shown). The vehicle 10 is also in train with two trailing vehicles, the first being a data processing vehicle 30 and the second being a power vehicle 32. The vehicles 30 and 32 are connected by a towing link 34 and both are connected to the vehicle 10 by a towing link 36. The vehicle 32 pulls an armoured umbilical cable 38 which supplies electric power to the vehicles 10 and 30 and also passes the inspection data from the sensors 22 to a computer (not shown) at the ground surface.

The chain 26 is connected to a swivel 40 at the front of the vehicle 10. The swivel 40 is rotatable about a bolt 42 which serves as a fixed axle which is screwed into the front end of the vehicle body with its longitudinal central axis coincident with the central longitudinal axis 44 of the vehicle 10.

The last link 46 of the chain 26 is freely slidable on a load bar 48 of the swivel 40. The load bar 48 extends between two guard members 50 each presenting a guard surface 52 at its extremity and the surface 52 of each guard member 50 also extending in a curve towards the axis 44. The guard members 50 are connected by a short cross-bar 54 to which the load bar 48 is secured by welding. FIGS. 2 and 3 show the swivel 40 in detail. The swivel 40 has needle bearings 56 which run on the bolt 42.

FIG. 1 shows the body 60 of the vehicle 10, which includes a forward stop 62, intermediate stop members 64 and a rear stop 66. Each foil in the packs 18, 20 is a stamping cut from a sheet of ferromagnetic material. The outer portion of each foil is formed as a circular array of fingers. FIG. 1 shows the foils in their underformed condition. The foils are slightly deformed when the vehicle 10 is installed in a straight pipe. When the vehicle 10 negotiates a bend, as shown in FIG. 1, the foils are severely deformed as shown in ghost outline at 78 and 80. The leading foils are bent backwardly to engage the forward stop and the intermediate stop members 64 adjacent the inner pipewall of the bend. The trailing foils engage the rear stop 66 adjacent the outer pipewall of the bend.

The sensors 22 are shown in FIG. 1 in the positions they occupy when the vehicle 10 is outside the pipe. When the vehicle 10 is installed in a straight pipe the mountings of the sensors 22 (not shown) allows the sensors 22 to occupy positions inward from the positions shown.

OPERATION

The electromagnet 14 produces an extremely strong field which passes into the pipewall 12 through one set of foils and returns to the core 16 via the other set of foils. Considerable drag forces arise at the interfaces between the foils and the pipewall 12. In a straight pipe the swivel 40 occupies a position about the longitudinal axis 44 such that the load bar 48 is vertical and directed downwards. In other words the load bar 48 is at 90° to the position shown in FIG. 1. The link 46 occupies a first position as close as possible to the axis 44, as indicated at 90 in FIG. 1 showing part of the link 46.

The vehicle 10 is required to successfully pass around very severe bends in the pipe 12. As shown for example, the six-inch pipe 12 has one-diameter bends, one of which is illustrated. A one-diameter bend is one in which the radius of curvature of the bend (measured to the pipe centre) is equal to the internal diameter of the pipe.

As a bend is approached, the line of action of the chain 26 changes relative to the load bar 48 and the swivel 40 is pulled into the position shown and at the same time the link 46 moves into the second position (as shown) further from the axis 44. The configuration prevents the link 46 from moving beyond the second position.

In certain circumstances, the guard surfaces 52 engage the inside of the pipewall 12 and prevent further deformation of the foils 18.

The line of action of the chain 26 has been moved to a position (as the vehicle 10 runs round the bend) in which it makes a smaller angle with the axis 44 than it would have done had the chain 26 been attached to an eye on the end of the bolt 42. As a result, the vehicle 10 travels smoothly around the bend instead of jamming in the bend owing to excessive friction at the pipewall and consequential turning moments on the vehicle.

Figure 4:
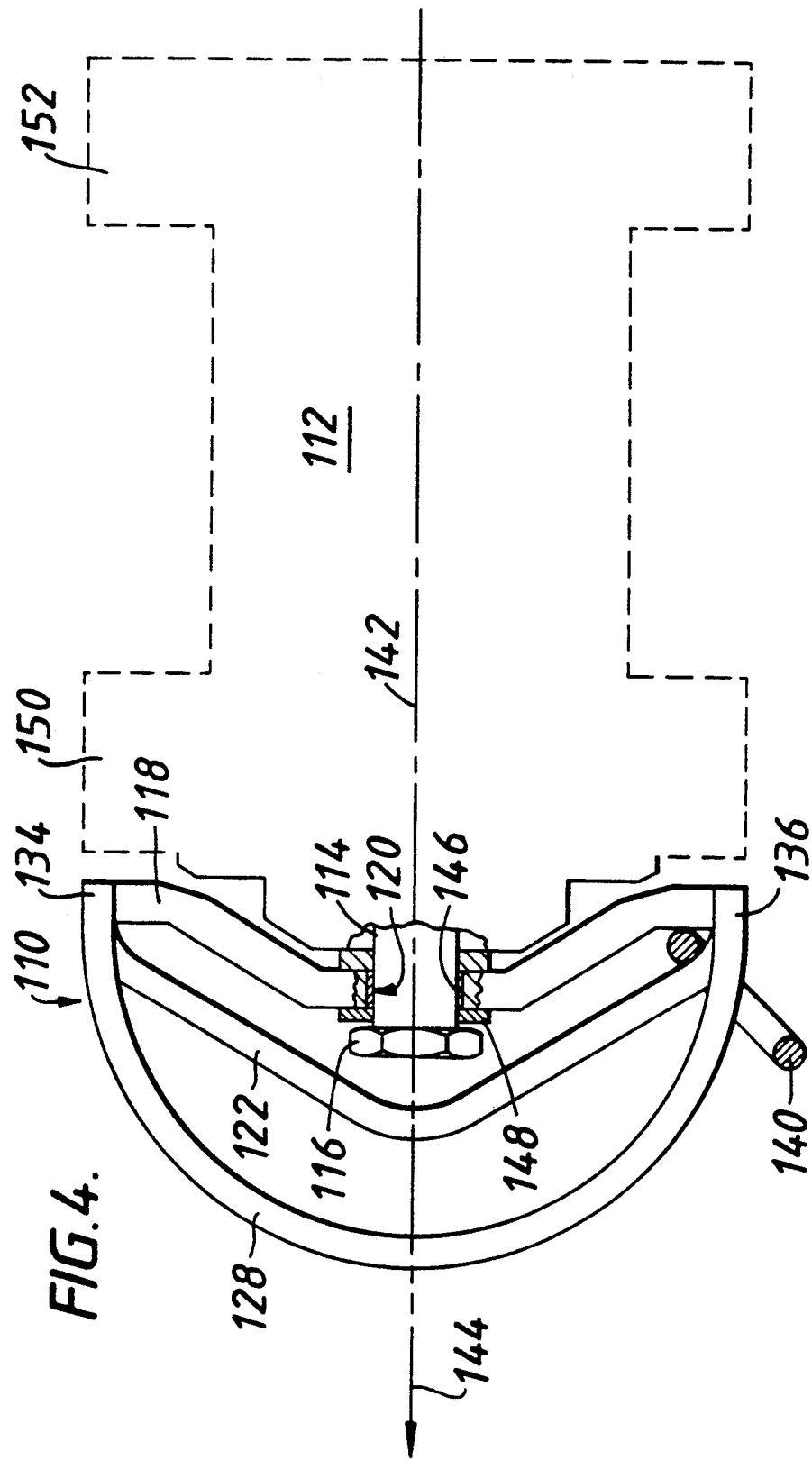
FIG. 4 is a plan, partly in horizontal section, of a second embodiment of a towing swivel shown secured to a pipe inspection vehicle shown in ghost outline.
Figure 5:
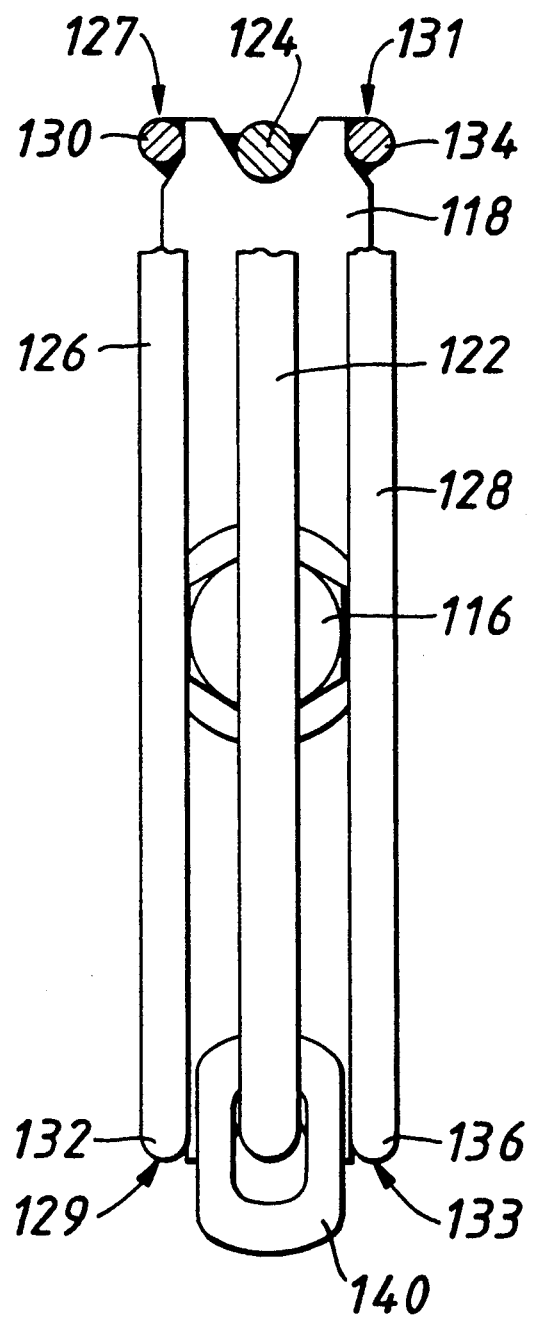
FIG. 5 is a front elevation of the swivel, partly in vertical section, shown in FIG. 4.

A second embodiment of swivel 110 is shown in FIGS. 4 and 5. It is shown attached to the front end of a vehicle 112. The swivel 110 consists of the following principal parts: a bolt 114 which is secured to a tapped hole in the leading end of the vehicle 112; the bolt 114 having a head 116; a beam 118 having a central aperture 120 through which the bolt 14 passes, the beam 118 being freely rotatable on the bolt 114; a load bar 122 of shallow V-shape with its ends 124 secured to the ends of the beam 118; two arcuate guard members 126, 128 having their ends 130, 132 and 134, 136, respectively, secured to the ends of the beam 118; and a link 140 freely slidable along the load bar 122. The guard members 126, 128 each present guard surfaces 127, 129; 131, 133, respectively.

The swivel 110 has an axis of rotation 142 defined by the bolt 114 and has a line of forward movement, with the vehicle 112, coincident with said axis 142 and indicated by the arrow 144.

Before the load bar 122 and the skid bars 126 and 128 are welded to the beam 118, it is ensured that the bearing 146, the bolt 114, the washer 148 and the link 140 are all fitted and retained in their proper positions. Thus, the lower parts of the V-shape of the load bar 122 allow the head 116 of the bolt 114, when the swivel 110 is unsecured to its vehicle 112, to move but otherwise the lower parts trap the bolt 114 in its aperture 120. The swivel 110 is thus self-contained and complete when it is removed from the vehicle 112.

The vehicle 112 is similar to the vehicle 10 and has packs of foils 150, 152 shown in outline in FIG. 4.

In straight pipe the vehicle 110 is towed from the centre of the load bar 122, the link 140 occupying its first position, in this case a position coincident with the axis 142. This ensures minimum side loading on the vehicle 110. On approaching a bend, the swivel 110 is pulled by the chain (of which only the trailing link 140 is shown) and rotates about the bolt 114. The link 140 has already moved along the load bar 122 so that one end of the load bar 122 (carrying the link 140) points to the inside of the bend around which the vehicle must pass. On subsequent entry to the bend the link 140 slides along the load bar 122 towards the second position, further from the axis 142 as shown in FIG. 4. The configuration prevents the link 140 from moving beyond the second position.

As a result, the angle which the chain makes with the axis 142 is reduced in a manner similar to that described for the first embodiment and passage of the vehicle 110 around the bend is facilitated.

I claim:

1. A pipeline inspection vehicle capable of being towed through a pipe and having a towing swivel at its front end, said towing swivel being rotatable about a central longitudinal axis of the vehicle, said towing swivel comprising a load bar extending transversely with respect to said axis and connection means freely slidable along the load bar for connecting said load bar to a towing line for towing the towing swivel, the connection means moving between a first position on the load bar corresponding to towing along a straight pipe and a second position corresponding to towing around a bend, said second position being further from said axis and closer to a center of curvature of said bend, and means for preventing said connection means from moving beyond said second position.

2. A pipeline inspection vehicle capable of being towed through a pipe and having a towing swivel at its front end, said towing swivel being rotatable about a central longitudinal axis of the vehicle, said towing swivel comprising a load bar extending transversely with respect to said axis and connection means freely slidable along the load bar for connecting said load bar to a towing line for towing the towing swivel, the connection means moving between a first position on the load bar corresponding to towing along a straight pipe and a second position corresponding to towing around a bend, said second position being further from said axis and closer to a center of curvature of said bend, wherein the swivel comprises a fixed axle mounted on the front of the vehicle, said position of said connection means being behind a leading end of said axle.

3. A vehicle according to claim 1 or 2, in combination with a second vehicle in train and ahead of said inspection vehicle and connected to said inspection vehicle by said towing line.

4. A vehicle according to claim 1 or 2, wherein a center of mass of said swivel is positioned to a first side of said axis and said load bar is also positioned to the first side.

5. A vehicle according to claim 1 or 2, wherein said load bar extends symmetrically on both sides of said axis.

6. A vehicle according to claim 5, wherein said load bar is inclined to said axis, said first position of the connection means being further from the rear of the vehicle than said second position.

7. A vehicle according to claim 1 or 2, wherein the swivel comprises at least one guard surface lying ahead of said load bar.

8. A vehicle according to claim 7, wherein said load bar lies between two guard members each providing a respective one of said guard surfaces when viewed from the front of the vehicle.

9. A vehicle according to claim 1 or 2, wherein said swivel is mounted on bearings.

10. A vehicle according to claim 1 or 2, wherein said connection means is connected to a single tow line.

11. A vehicle according to claim 1 or 2, wherein said load bar is rigidly fixed to said towing swivel.

12. A vehicle according to claim 1 or 2, wherein said load bar points to an inside of said bend when said connection means is in said second position.

* * * * *